(12) United States Patent
Minami

(10) Patent No.: US 7,568,053 B2
(45) Date of Patent: Jul. 28, 2009

(54) USB COMPOSITE DEVICE, USB COMMUNICATION SYSTEM, AND USB COMMUNICATION METHOD

(75) Inventor: Eiji Minami, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 124 days.

(21) Appl. No.: 11/784,276

(22) Filed: Apr. 5, 2007

(65) Prior Publication Data

US 2007/0245055 A1    Oct. 18, 2007

(30) Foreign Application Priority Data

Apr. 5, 2006  (JP)  ............................. 2006-103750

(51) Int. Cl.
*G06F 3/00*    (2006.01)
(52) U.S. Cl. .................. 710/8; 710/3; 710/10; 710/11; 710/33; 710/62
(58) Field of Classification Search ...................... 710/3, 710/8, 10, 11, 33, 62
See application file for complete search history.

(56) References Cited

U.S. PATENT DOCUMENTS

2007/0016714 A1* 1/2007 Huotari et al. .............. 710/313
2007/0214276 A1* 9/2007 Panabaker et al. .......... 709/230
2007/0233910 A1* 10/2007 Paley et al. .................... 710/36

FOREIGN PATENT DOCUMENTS

JP    2003-198779    7/2003

* cited by examiner

*Primary Examiner*—Niketa I Patel
*Assistant Examiner*—Jasjit S Vidwan
(74) *Attorney, Agent, or Firm*—Edwards Angell Palmer & Dodge LLP; John J. Penny, Jr.

(57) ABSTRACT

A USB composite device including devices of different USB subclasses and enable communications between the devices and a host without increasing the number of logic interfaces, comprising a first device having a first USB subclass and a second device having a second USB subclass corresponding to a second communication command are assigned as devices of the same USB subclass to the same logic interface, and logic interface information that associates the same logic interface with the same USB subclass and the number of logical units are sent to the host. The first and second devices send back device information to the host for each logical unit in response to an inquiry about the device information from the host with the same communication command, and the host performs communications with the communication command supported by each device.

6 Claims, 7 Drawing Sheets

FIG. 2
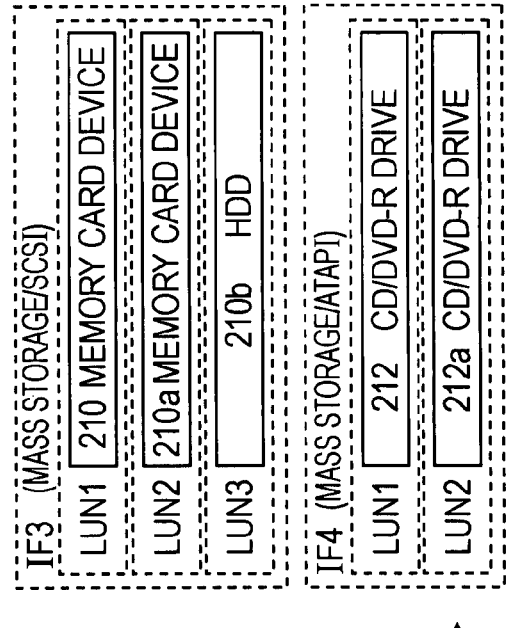
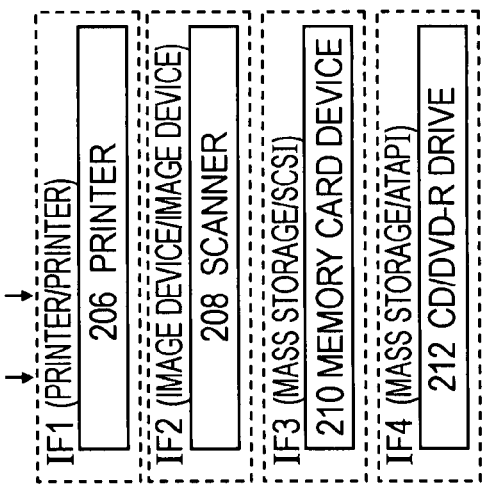

| COMMAND | SCSI COMMAND | ATAPI COMMAND |
|---|---|---|
| Read | SUPPORT | SUPPORT |
| Write | SUPPORT | SUPPORT |
| Inquiry | SUPPORT | SUPPORT |
| Read Disc Information | WITHOUT SUPPORT | SUPPORT |
| Set CD Speed | WITHOUT SUPPORT | SUPPORT |
| ... | ... | ... |

USB COMPOSITE DEVICE, USB COMMUNICATION SYSTEM, AND USB COMMUNICATION METHOD

Priority is claimed to Japanese patent application No. 2006-103750 filed on Apr. 5, 2006, the disclosure of which, including the specification, drawings and claims, is incorporated herein by reference in its entirety.

BACKGROUND

1. Technical Field

The present invention relates to a USB composite device, a USB communication system, and a USB communication method, and more specifically to a USB composite device, a USB communication system, and a USB communication method, in which, among plural devices having different USB subclasses, devices having the same USB subclasses are assigned to the same logic interface and a host is allowed to communicate with each device with a communication command corresponding to the device for a corresponding logical unit of the logic interface.

2. Related Art

There has been known a complex machine including devices such as a printer, a scanner, and a facsimile machine and connected to a host such as a personal computer. For example, Patent Document 1 discloses how such a complex machine is connected with a personal computer through a USB (universal serial bus) interface and the personal computer controls functions of each device of the complex machine.

Further, in recent years, there has been proposed a method of adding a device to which a memory card or other such storage media can be inserted, such as a memory card reader/writer to a complex machine of this type, and connecting a host to the complex machine through a USB interface to allow the host to transmit/receive data to/from the storage medium inserted into the complex machine. To be specific, plural logic interfaces conforming to the USB standards are set for a single physical interface, and devices such as a printer or a memory card reader/writer are assigned to the logic interfaces to thereby allow the host to identify a device to every logic interface and transmit/receive data to/from the device.

[Patent Document 1]

Japanese Unexamined Patent Application Publication No. 2003-198779

SUMMARY

A USB class and USB subclass of a device such as a printer or a memory card reader/writer are defined on the basis of USB standards in accordance with a device type and a type of communication command supported by the device. For example, the memory card reader/writer has a USB class of "mass storage" and a USB subclass of "SCSI". In the case of connecting plural devices, one logic interface is assigned to devices having the same USB class and USB subclass on the basis of USB standards. Thus, if a complex machine incorporates plural devices having different USB classes and USB subclasses, it is necessary to prepare as many logic interfaces as the number of combinations of USB class and USB subclass.

Therefore, different logical interfaces should be assigned to devices of different USB classes in a composite machine, such as a printer and a scanner. Further, in the case of using devices having the same USB class but having different USB subclasses, such as a memory card reader/writer having the USB class of "mass storage" and the USB subclass of "SCSI" and a CD/DVD-R drive having the USB class of "mass storage" and the USB subclass of "ATAPI", different interfaces should be assigned in accordance with the USB subclass.

However, if the number of logic interfaces increases, a device controller incorporated in the complex machine needs to increase its circuit size to control the increased interfaces, leading to a problem of high costs.

The present invention has been accomplished in view of the above problem, and it is accordingly the object of the present invention to provide a USB composite device including devices of different USB subclasses and enable communications between the devices and a host without increasing the number of logic interfaces.

In order to achieve the above object, a USB composite device according to a first aspect of the present invention includes: a plurality of devices having different USB subclasses each corresponding to a communication command type of communications with a host, and assigned to logic interfaces, the USB composite device communicating with the host with one USB subclass set to each of the logic interfaces, wherein a first device having a first USB subclass corresponding to a first communication command and a second device having a second USB subclass corresponding to a second communication command including the same communication command as the first communication command are assigned as devices of the same USB subclass to the same logic interface, and logic interface information that associates the same logic interface with the same USB subclass is sent back in response to a request from the host to cause the host to send an inquiry about the number of logical units defined in association with the logic interface with the same communication command. Then, the number of logical units corresponding to the first and second devices are sent back in response to the inquiry about the number of logical units from the host to cause the host to send an inquiry about device information for each of the logical units with the same communication command, and the first device assigned to a first logical unit sends device information corresponding to the first USB subclass and the second device assigned to a second logical unit sends device information corresponding to the second USB subclass to the host in response to the inquiry about the device information from the host, and then the host is caused to communicate with the first device with the first communication command and communicate with the second device with the second communication command.

According to the first aspect of the present invention, the USB composite device assigns devices having different USB subclasses as devices of the same USB subclass to the same logic interface. As for the same logic interface, logic interface information associated with the same USB subclass is sent to the host to thereby let the host temporarily identify a logical unit in association with the same logic interface. Then, the devices assigned to each logic interface transmit device information including the USB subclass to the host, whereby the host communicates with each device with a command supported by each device in accordance with the USB subclass. Hence, the USB composite device can connect devices of different USB subclasses without increasing the number of logic interfaces.

BRIEF DESCRIPTION OF THE DRAWINGS

FIG. 2 are tables illustrating associations of a logic interfaces with a pair of USB class and USB subclass of a device according to the embodiment of the present invention.

DETAILED DESCRIPTION

Hereinafter, embodiments of the present invention will be described with reference to the drawings. The technical scope of the present invention is not limited to the embodiments but encompasses elements described in the scope of claims and equivalents thereof.

Here, the terms used in the following description are explained. The term "device" means any one of various peripheral devices such as a printer and a CD/DVD-R drive. The term "USB composite device" means a device including plural devices and connected to a host via a single physical interface conforming to the USB standards while controlling communications between each device and the host. Further, the term "USB class" means a category of device such as a printer or mass storage, which is determined in accordance with a device type on the basis of USB standards. The term "USB subclass" means a category of device such as SCSI or ATAPI, which is determined in accordance with a command type supported by the device on the basis of USB standards. This category is subordinate to the USB subclass. Further, the term "logic interface" means a logical destination on the basis of USB standards, and each logic interface has a logic address and is assigned to individual devices. Further, the term "logical unit" means a logical destination based on USB standards, which is subordinate to the logic interface, and each logical unit has a logic address and is assigned to individual devices belonging to the same logic interface. Further, the term "logic interface information" means information about a logic interface such as a USB class or USB subclass of a device assigned to the logic interface. The term "device information" means information about a device type such as a USB subclass of a device assigned to a logic interface or a logical unit, a memory card reader/writer, or a CD/DVD-R drive.

Figure 1:
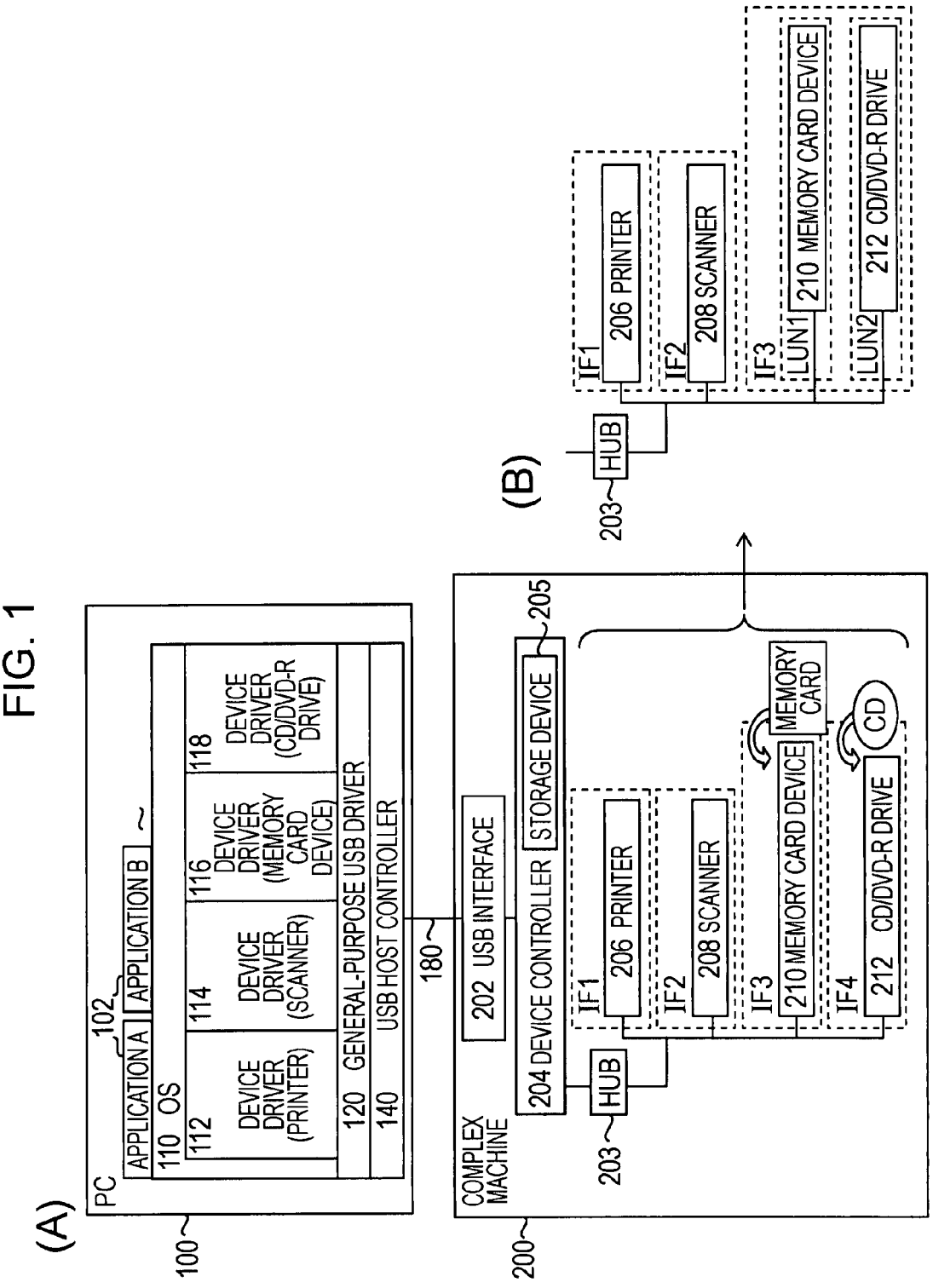
FIG. 1 are diagrams of a host and a USB composite device according to an embodiment of the present invention.

FIG. 1 are diagrams of a host and a USB composite device according to an embodiment of the present invention. In this embodiment, a host is a personal computer 100, and a USB composite device that is a complex machine 200 incorporating a printer, a scanner, a memory card reader/writer (hereinafter referred to as "memory card device"), a CD/DVD-R drive, or other such devices is connected with the personal computer 100 through an interface conforming to the USB standards. FIG. 1(A) illustrates a configuration of the related art, and FIG. 1(B) illustrates a characteristic configuration of this embodiment.

In FIG. 1(A), the personal computer 100 includes, as software components, an application program 102, an operating system 110, a general-purpose USB driver 120, a printer device driver 112, a scanner device driver 114, a memory-card-device device driver 116, and a CD/DVD-R drive device driver 118, and includes a USB host controller 140 as a hardware component.

The application program 102 is a software program including functions necessary for a user such as a word processing program, a spreadsheet program, or an image processing program. The application program transfers input data or various commands to the operating system 110. The operating system 110 is a software component that exercises control over resources of the personal computer 100, for example, Microsoft Windows (registered trademark). The operating system 110 transfers the data or commands input from the application program 102 to various device drivers 112 to 118 such as the printer device driver 112.

The various device drivers 112 to 118 such as the printer device driver 102 are driver programs compliant with commands supported by individual devices in the complex machine 200 as described below. For example, the memory card device driver 116 converts a command input from the operating system 110 to an SCSI command supported by the memory card device and transfers the converted command to the general-purpose USB driver 120.

The general-purpose USB driver 120 controls the USB host controller 140, and the USB host controller 140 is connected with the complex machine 200 through a USB cable 180 by means of a not-shown USB connector to establish communications with the complex machine 200 in conformity with the USB standards. The USB host controller 140 stores a logic interface or logical unit number of a device in the complex machine 200, and converts various commands or data transferred from the printer device driver 102 or the like into packets on the basis of USB standards to transmit the packets to a target logic interface or logical unit in the complex machine 200.

The complex machine 200 includes a USB interface 202, a device controller 204, a printer 206, a scanner 208, a memory card device 210, and a CD/DVD-R drive 212.

The USB interface 202 communicates with the personal computer 100 through the USB cable 180 by means of a not-shown USB connector. That is, the USB interface 202 transmits/receives packets on the basis of USB standards, executes mutual conversion between serial data and parallel data, and generates/decomposes packets. Further, the interface extracts commands or data received from the personal computer 100 from the packets to transfer the extracted commands or data to the device controller 204 or send data from the device controller 204 to the personal computer 100.

The device controller 204 is connected to the printer 206, the scanner 208, the memory card device 210, the CD/DVD-R drive 212, or other such devices through a USB hub 203. Logic interfaces IF1 to IF4 are assigned to these devices. The device controller 204 stores logic interface information such as a USB class or USB subclass of the assigned device for each of the logic interfaces IF1 to IF4 in a storage device 205. Then, in response to a request from the USB host controller 140, the device controller 204 reads the logic interface information from the storage device 205 and sends the read information, with the result that the general-purpose USB driver 120 can identify the device for each logic interface and store correspondence between the logic interface and the device in a storage device of the USB host controller 140.

Referring now to FIG. 2, description is made of how the logic interfaces IF1 to IF4 are assigned to devices such as the printer 206 on the basis of USB standards in accordance with a USB class or USB subclass of each device.

As shown in FIG. 2(A), a USB class corresponding to a device type and a USB subclass corresponding to a type of a communication command for communications with a host, which is supported by the device, are defined for each device on the basis of USB standards. That is, a USB class of the printer 206 is "printer", and a USB subclass thereof is "printer". Further, a USB class of the scanner 208 is "image device", and a USB subclass thereof is "image device". Further, a USB class of the memory card device 210 is "mass storage", and a USB subclass thereof is "SCSI". A USB class of the CD/DVD-R drive 212 is "vmass storage", and a USB subclass thereof is "ATAPI".

In principle, a general-purpose driver on the host side makes an inquiry about device information on a device assigned to a logic interface with a command supported by the device on the logic interface basis as specified by the USB standards. Thus, it is defined that devices having the same USB class and USB subclass are assigned to one logic interface such that one command type corresponds to one logic interface.

Hence, as shown in FIG. 2(B), it is impossible to assign plural devices of different USB classes or devices of the same USB class and different USB subclasses, that is, devices different in a command type to one logic interface. That is, the first logic interface IF1 is assigned to the printer 206 having the USB class of "printer" and the USB subclass of "printer". The second logic interface IF2 is assigned to the scanner 208 having the USB class of "image device" and the USB subclass of "image device". The third logic interface IF3 is assigned to the memory card device 210 having the USB class of "vmass storage" and the USB subclass of "SCSI". Here, the CD/DVD-R drive has the same USB class as the memory card device 210, that is, "mass storage", but its USB subclass is "ATAPI" unlike the memory card device. Thus, the fourth logic interface IF4 different from the interface of the memory card device 210 is assigned to the CD/DVD-R drive 212.

As described above, the logic interfaces are set as appropriate to thereby establish connection between plural devices and the device controller 204 through the USB hub 203 on the basis of USB standards. However, if the number of devices having different USB classes and USB subclasses is increased, the number of logic interfaces is increased. As a result, the device controller 204 is required to increase a circuit size. Further, the logic interface information should be managed for each logic interface, leading to a problem of increasing consumption of memory resources and increasing a processing load.

In principle, devices having the same USB class and USB subclass should be assigned to one logic interface on the basis of USB standards as described above. Thus, any devices having the same USB class and USB subclass can be assigned to one logic interface. For example, as shown in FIG. 2(C), one logic interface IF3 can be assigned to three devices of the memory card device 210, a second memory card device 210a, and a hard disk drive 210b having the USB class of "mass storage" and the USB subclass of "SCSI". Likewise, one logic interface IF4 can be assigned to two devices of the CD/DVD-R drive 212 and a second CD/DVD-R drive 212a having the USB class of "mass storage" and the USB subclass of "ATAPI". In either case, logical units LUN1, LUN2, . . . are subordinate to the logic interfaces, and the general-purpose USB driver 120 can identify devices assigned to each logical unit.

In the above case, when the general-purpose USB driver 120 identifies devices assigned to each logical unit, the driver makes an inquiry in two steps. Although detailed later with reference to FIG. 4, as a first step, the driver makes an inquiry about logic interface information such as a USB class and USB subclass of a device assigned to a logic interface, and the device controller 204 responds to the inquiry. As a second step, the general-purpose USB driver 120 acquires data about a USB subclass corresponding to the logic interface, and then sends an inquiry about device information to each device of a logical unit assigned to the logic interface with a command corresponding to the USB subclass, and identifies a type of the device or command supported by the device for each logical unit on the basis of the device information sent back from the device.

Accordingly, if logic interface information that associates the third logic interface IF3 with the USB subclass of "SCSI" is sent when the device controller 204 responds the inquiry at the first step, for example, the general-purpose USB driver 120 sends an inquiry with an SCSI command at the second step. Then, the memory card device 210 supporting the SCSI command assigned to the third logic interface IF3 responds to the inquiry and can sent back a device type. Further, if logic interface information that associates the fourth logic interface IF4 with the USB subclass of "ATAPI" is sent, the general-purpose USB driver 120 makes an inquiry with an ATAPI command. Then, the CD/DVD-R drive 212 supporting the ATAPI command assigned to the fourth logic interface IF4 can send back a device type in response thereto.

Figure 3:
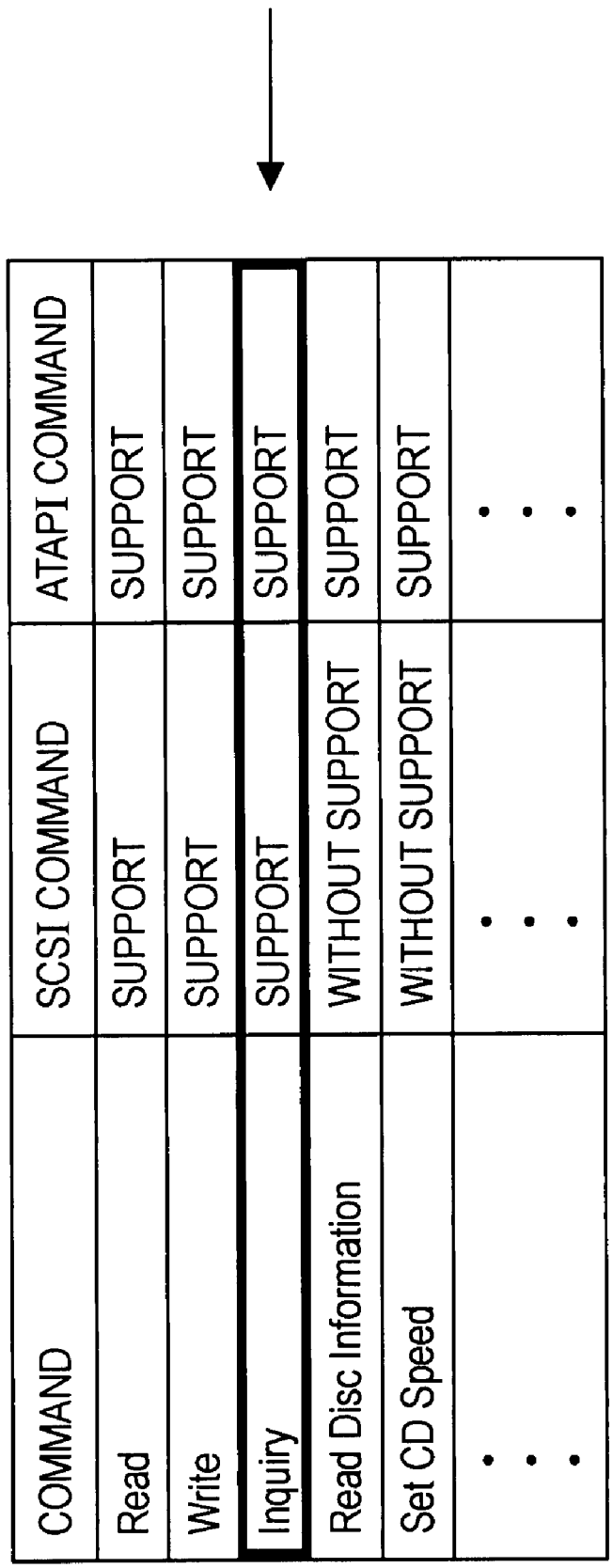
FIG. 3 is a table demonstrating a result of comparing an SCSI command with an ATAPI command.

Here, the SCSI command and the ATAPI command include a common command. For example, as shown in a table of FIG. 3, Read, Write, and other such commands for reading/writing data to/from a storage medium of a device or an Inquiry command for a host to inquire about a device type are commonly supported. Hence, irrespective of whether the USB subclass associated with the logic interface is "SCSI" or "ATAPI", the Inquiry command is sent at the first step. Then, both of the devices having the USB subclass of "SCSI" such as the memory card device 210 and the devices having the USB subclass of "ATAPI" such as the CD/DVD-R drive 212 can send back device information in response to the Inquiry command as a common command.

Referring back to FIG. 1(B), in this embodiment, the complex machine 200 assigns the memory card device 210 and the CD/DVD-R drive 212 as devices of a common USB subclass to the third logic interface IF3. That is, at the first step of device identification, even though the USB subclass of the memory card device 210 is "SCSI", logic interface information is temporarily sent to the host while a common USB subclass corresponding to the third logic interface IF3 is set to "ATAPI".

As a result, at the second step of device identification, the general-purpose USB driver 120 can send an inquiry about device information to the memory card device 210 and the CD/DVD-R drive 212 for each logical unit (LUN1, LUN2) associated with the third logic interface IF3 with the Inquiry command that is included in both of the SCSI command and the ATAPI command.

Then, device information that the memory card device 210 of the first logical unit LUN1 is a memory card device having the USB subclass of "SCSI" and device information that the CD/DVD-R drive 212 of the second logical unit LUN2 is a CD/DVD-R drive having the USB subclass of "ATAPI" are sent for each logical unit. As a result, a device drive necessary for communications with each device can be downloaded to the general-purpose USB driver 120 in accordance with the USB subclass.

In this way, the personal computer 100 can perform communications by use of a device driver appropriate to each device. These devices can be connected without increasing a circuit size of the device controller on the complex machine 200 side.

Figure 4:
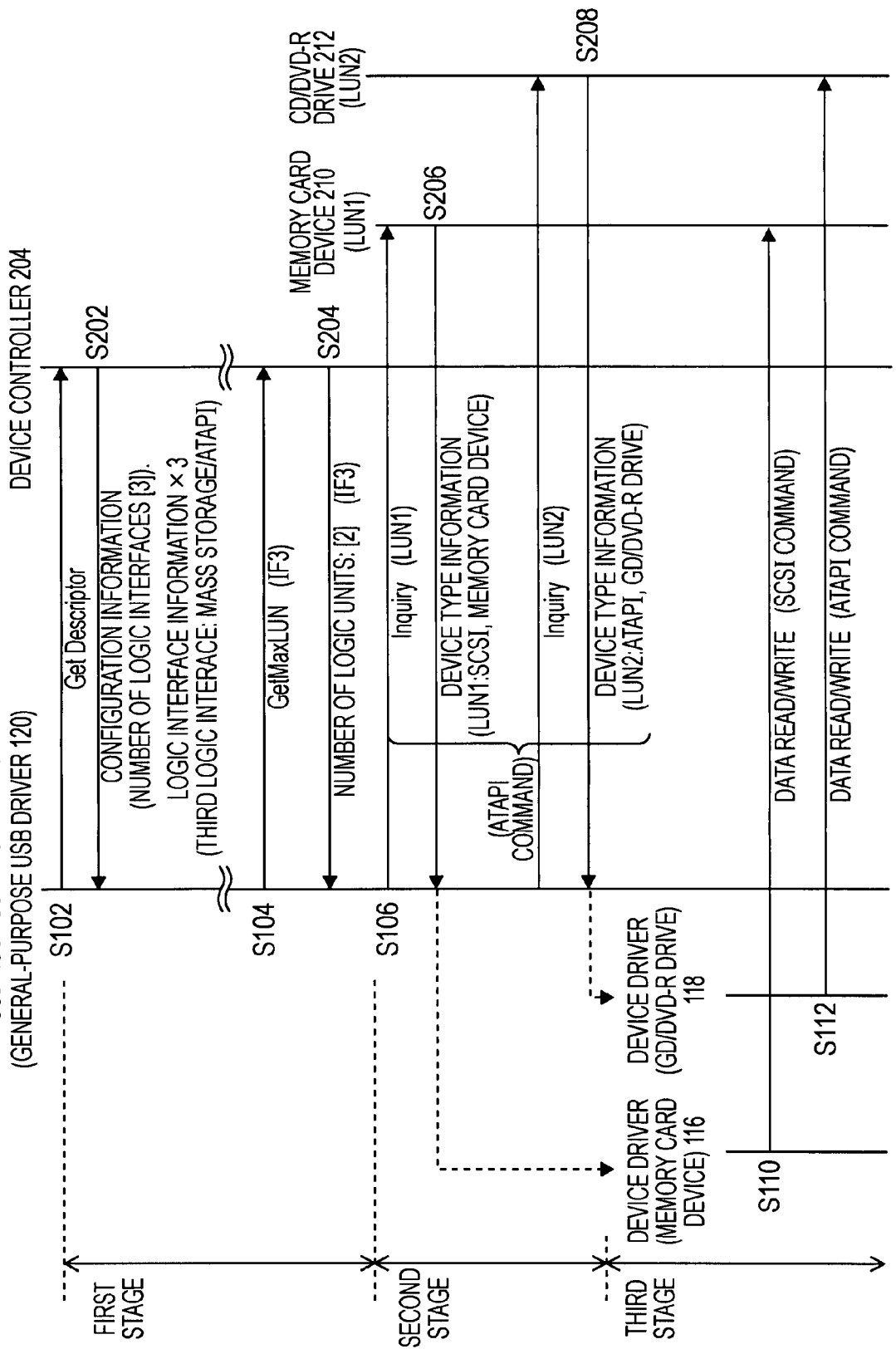
FIG. 4 illustrates a procedure of transmitting/receiving data between a personal computer 100 and a complex machine 200.

FIG. 4 illustrates a procedure of transmitting/receiving data between the personal computer 100 and the complex machine 200. Referring to FIG. 4, description is given of a procedure in which, when the personal computer 100 is connected with the complex machine 200 through the USB cable 180, an inquiry is sent to the device controller 204 from the USB host controller 140 in accordance with the general-purpose USB driver 120 to start-up USB connection, and the device controller 204 sends back data in response to the inquiry.

First, the overall procedure is, as described above, divided into a first step of acquiring information about a logic interface in the complex machine 200 with the USB host controller 140 (steps S102 to S104 and steps S202 to S204) and a second step of sending an inquiry about a device type to individual devices on the logic interface basis (steps S106 to S108 and steps S206 to S208) and moreover, a third step of downloading a device driver to the general-purpose USB driver 120 and performing communications with a command supported by each device (steps S110 and S112). Hereinbelow, each step is described.

[First Step]

After the start-up, the general-purpose USB driver 120 first causes the USB host controller 140 to send a GetDescriptor command conforming to the USB standards to acquire information about devices of the complex machine 200 (S102).

Figure 5:
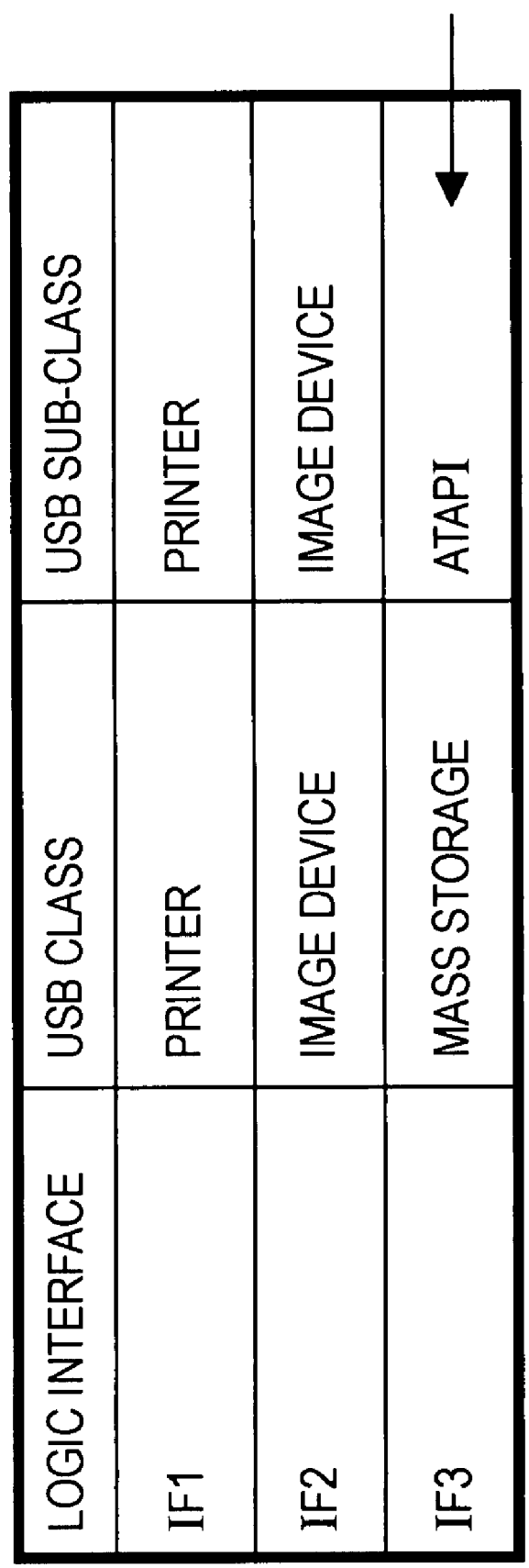
FIG. 5 illustrates correspondence between a logic interface, a USB class, and a USB subclass stored in a storage device 205.

Then, the device controller 204 sends back, as configuration information of the complex machine 200, a configuration descriptor that describes the total number of logic interfaces "3", and further sends back an interface descriptor that describes logic interface information including a USB class and USB subclass of devices assigned to the logic interfaces IF1 to IF3 for each of the logic interfaces IF1 to IF3 (S202). At this time, the storage device 205 stores correspondence data between the logic interfaces, the USB class, and USB subclass as shown in FIG. 5. This data is read to send logic interface information for each logic interface.

As shown in FIG. 5, the third logic interface IF3 is associated with the USB class of "mass storage" and the USB subclass of "ATAPI" and stored in the storage device 205. In this embodiment, the memory card device 210 having the USB class of "SCSI" and the CD/DVD-R drive 212 having the USB class of "ATAPI" are assigned to the third logic interface IF3 as devices having the USB subclass of "ATAPI". Then, logic interface information that associates the third logic interface IF3 with the USB subclass of "ATAPI" is sent to the host. As a result, the general-purpose USB driver 120 can send an inquiry about a device type with the ATAPI command with reference to numbers of logical units subordinate to the third logic interface IF3.

Referring back to FIG. 4, after the USB host controller 140 receives logic interface information about all logic interfaces, the general-purpose USB driver 120 specially requests the maximum number of logical units subordinate to the third logic interface IF3 in accordance with the logic interface information. Thus, the general-purpose USB driver 120 sends GetMaxLUN (logical unit number) as a command to inquire about the maximum number of logical units on the basis of USB standards to the device controller 204 (S104). Then, the device controller 204 reads the number of logical units of the third logic interface IF3, that is, the number of logical units to which the memory card device 210 and the CD/DVD-R drive 212 are assigned, "2", from the storage device 205 and sends the read data in response to the inquiry (S204).

[Second Step]

Next, after the USB host controller 140 receives the data about the maximum number of logical units, the general-purpose USB driver 120 requests a device type for each logical unit number. That is, the general-purpose USB driver 120 first sends an Inquiry command to the first logical unit LUN1 with the ATAPI command (S106).

Here, the memory card device 210 corresponding to the first logical unit LUN1 is a device supporting the SCSI command, but as described above, the Inquiry command is sharable between the SCSI command and the ATAPI command, so the memory card device 210 can receive and respond the Inquiry command. Thus, the memory card device 210 can send device information that indicates a memory card device having the USB subclass of "SCSI" (S206).

Further, the general-purpose USB driver 120 sends an Inquiry command also to the second logical unit LUN2 with the ATAPI command (S108). Then, the CD/DVD-R drive 212 corresponding to the second logical unit LUN2 supports the ATAPI command, and thus receives and responds the Inquiry command to send device information that represents a CD/DVD-R drive having the USB subclass of "ATAPI" (S208).

Then, the general-purpose USB driver 120 recognizes that the first logical unit LUN1 of the third logic interface IF3 is connected with the memory card device supporting the SCSI command in accordance with the device information sent from the memory card device 210, and downloads the memory-card-device device driver 116 compliant with the SCSI command. Further, the general-purpose USB driver 120 recognizes that the second logical unit LUN2 of the third logic interface IF3 is connected with the CD/DVD-R drive supporting the ATAPI command in accordance with the device information sent from the CD/DVD-R drive 212, and downloads the DVD-R drive device driver 118 compliant with the ATAPI command.

[Third Step]

From this step forward, the memory-card device driver 116 converts the command received from the operating system 110 into an SCSI command and transfers the SCSI command to the general-purpose USB driver 120, and the general-purpose USB driver 120 can send data to the first logical unit LUN1 of the third logic interface IF3 with the SCSI command and read/write data to/from the memory card device 210 (S110).

Likewise, the CD/DVD-R device driver 118 converts the command received from the operating system 110 into an ATAPI command and transfers the ATAPI command to the general-purpose USB driver 120, and the general-purpose USB driver 120 can send data to the second logical unit LUN2 of the third logic interface IF3 with the ATAPI command and read/write data to/from the CD/DVD-R drive 212 (S112).

Incidentally, the reason the logic interface information that describes the USB subclass of the third logic interface IF3 as "ATAPI", not "SCSI", at the first step is as follows. That is, an operational procedure of the host controller 204 corresponds to operations of the general-purpose USB driver 120 on the basis of the specifications conforming to the current USB standards, but the operational procedure of the general-purpose USB driver 120 might be changed due to a change of the specifications. That is, the general-purpose USB driver 120 downloads a device driver appropriate to each device at the time when receiving the device information for each logical unit at the second step under current conditions, but there is a possibility that, at the first step in which the general-purpose USB driver 120 obtains a USB subclass in the logic interface information for each logic interface, a device driver supporting a command corresponding to the USB subclass is downloaded. In such cases, the following problem occurs if the USB subclass of the third logic interface IF3 is set to "SCSI".

Figure 6:
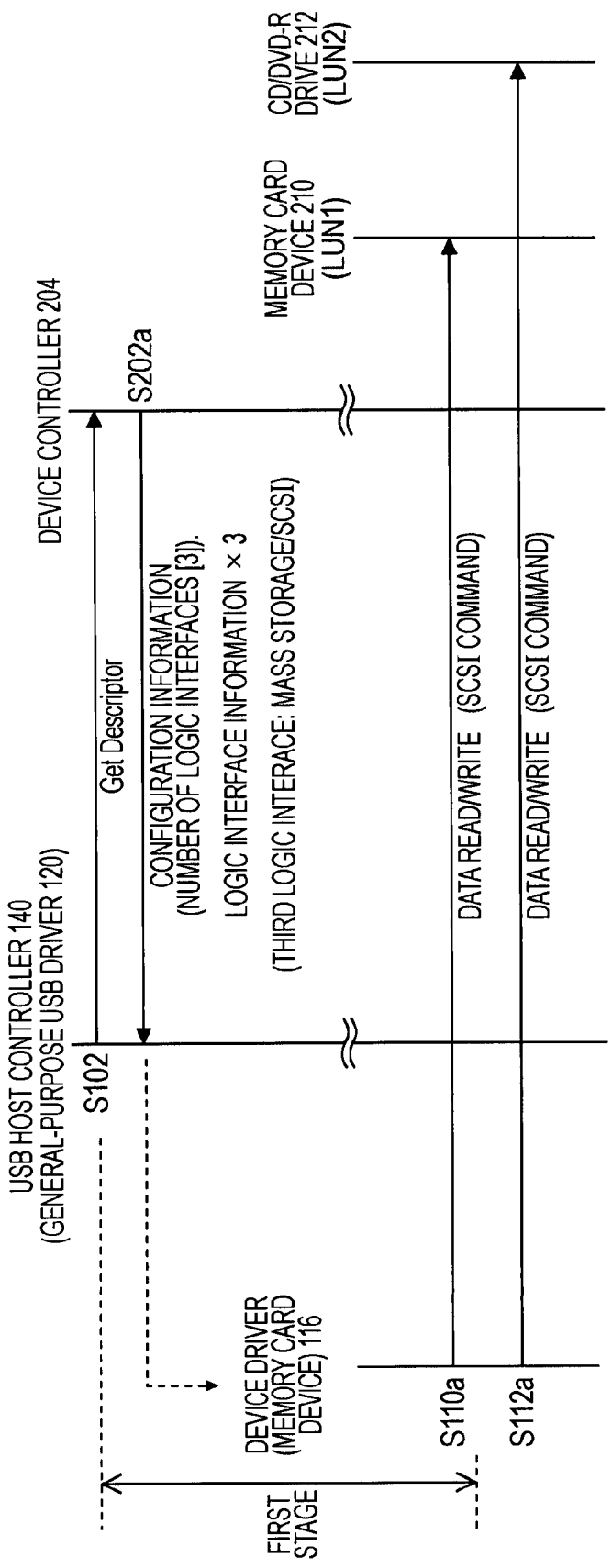
FIG. 6 illustrates a procedure of transmitting/receiving data between the personal computer 100 and the complex machine 200 in the case where an operational procedure of the general-purpose USB driver 120 is changed.

As shown in FIG. 6, if the device controller 204 is assumed to send logic interface information that describes the USB subclass of the third logic interface IF3 as "SCSI" (S202a), the general-purpose USB driver 120 downloads the memory-card-device device driver 116 as a device driver compliant with the SCSI command. As a result, the memory-card-device device driver 116 reads/writes data to/from the memory card device 210 or the CD/DVD-R drive 212 after that (S110a and S112a).

However, as understood from the comparison of the SCSI command with the ATAPI command (FIG. 3), the ATAPI command covers main commands of the SCSI command, but the SCSI command does not support a CD/DVD-R-specific command supported only by the ATAPI command, for example, ReadDiscInformation or SetCDSpeed. Therefore, no problem occurs in the case where the memory-card-device device driver 116 communicates with the memory card device 210 with the SCSI command (S110a), but a problem that the above CD/DVD-R-specific command cannot be used occurs in the case of communicating with the CD/DVD-R drive 212 with the SCSI command.

Figure 7:
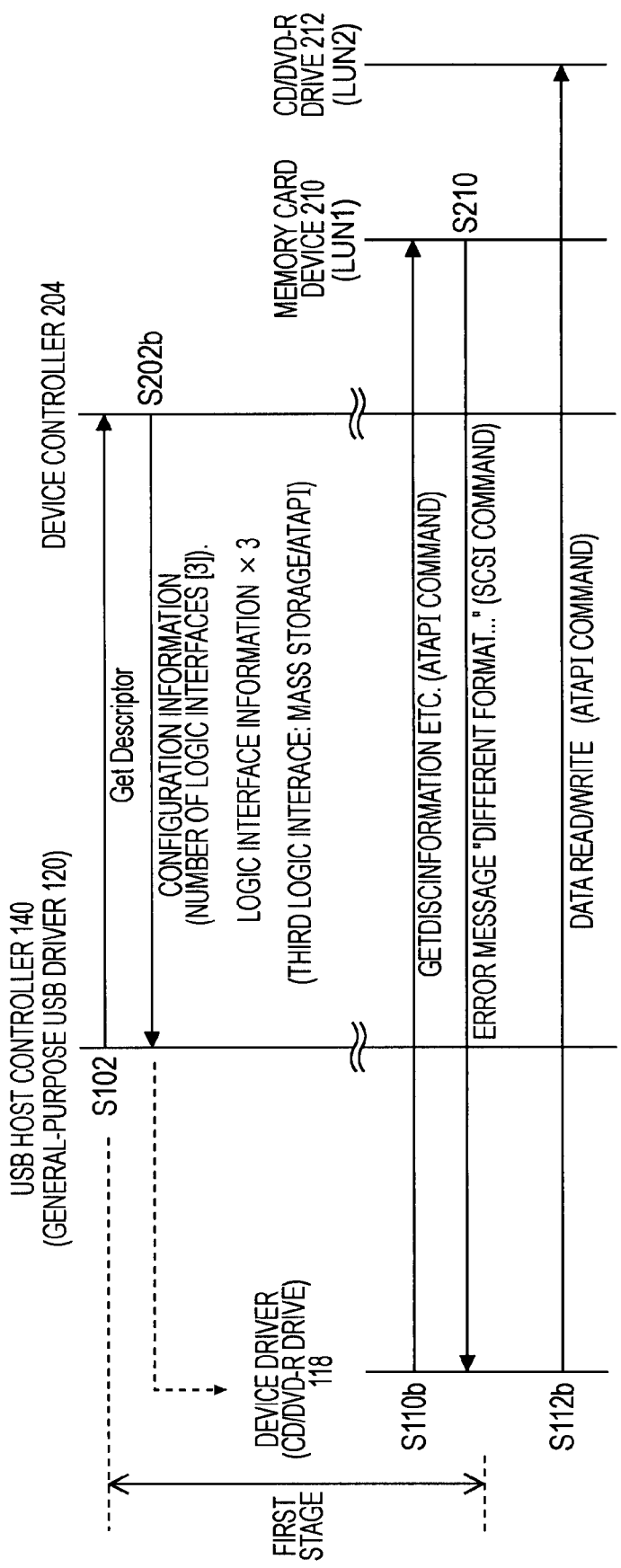
FIG. 7 illustrates another procedure of transmitting/receiving data between the personal computer 100 and the complex machine 200 in the case where an operational procedure of the general-purpose USB driver 120 is changed.

To that end, in this embodiment, the device controller 204 sends logic interface information that describes the USB subclass of the third logic interface IF3 as "ATAPI" to the general-purpose USB driver 120 to thereby overcome the above problems even if an operational procedure of the general-purpose USB driver 120 is changed. That is, as shown in FIG. 7, if the device controller 204 sends logic interface information that describes the USB subclass of the third logic interface IF3 as "ATAPI" (S202b), the CD/DVD-R drive device driver 118 as a device driver compliant with the ATAPI command covering main commands of the SCSI command is downloaded. After that, the CD/DVD-R drive device driver 118 reads/writes data to/from the memory card device 210 or the CD/DVD-R drive 212 (S110b and S112b), so the above problems can be overcome.

Further, in this case, the CD/DVD-R-specific command supported only by the ATAPI command might be sent to the memory card device 210 (S110b). In general, in this case, an error message that the command is not supported is sent back from the controller of the memory card device 210, which is contradictory to the USB subclass of the third logic interface IF3 set to "ATAPI". As a result, a failure might occur in the processing of the general-purpose USB driver 120. Hence, an error message that a medium format is not correct is sent back instead, for example (S210) to prevent the failure in the processing of the general-purpose USB driver 120 not to cause a contradiction.

Incidentally, as the USB composite device, a USB composite device including plural storage devices, for example, a hard disk drive or an MO drive in addition to the memory card device or CD/DVD-R may be used in place of the complex machine 200.

As set forth above, according to the USB composite device of the present invention, communications with a host can be performed with the devices of different USB subclasses assigned to the same logic interface without increasing a circuit size of the device controller.

The invention claimed is:
1. A USB composite device, comprising:
a plurality of devices having different USB subclasses each corresponding to a communication command type of communications with a host, and assigned to logic interfaces, the USB composite device communicating with the host with one USB subclass set to each of the logic interfaces,
wherein a first device having a first USB subclass corresponding to a first communication command and a second device having a second USB subclass corresponding to a second communication command including the same communication command as the first communication command are assigned as devices of the same USB subclass to the same logic interface, and logic interface information that associates the same logic interface with the same USB subclass is sent back in response to a request from the host to cause the host to send an inquiry about the number of logical units defined in association with the logic interface with the same communication command,
the number of logical units corresponding to the first and second devices are sent back in response to the inquiry about the number of logical units from the host to cause the host to send an inquiry about device information for each of the logical units with the same communication command, and
the first device assigned to a first logical unit sends device information corresponding to the first USB subclass and the second device assigned to a second logical unit sends device information corresponding to the second USB subclass to the host in response to the inquiry about the device information from the host, and then the host is caused to communicate with the first device with the first communication command and communicate with the second device with the second communication command.

2. The USB composite device according to claim 1, wherein the first and second devices are storage devices that input/output data to/from a storage medium.

3. A USB communication system, comprising:
a plurality of devices having different USB subclasses each corresponding to a communication command type of communications with a host;
a USB composite device assigning logic interfaces to the devices and setting one USB subclass to each of the logic interfaces; and
the host communicating with the USB composite device,
wherein the USB composite device assigns a first device having a first USB subclass corresponding to a first communication command and a second device having a second USB subclass corresponding to a second communication command including the same communication command as the first communication command as devices of the same USB subclass to the same logic interface, and sends logic interface information that associates the same logic interface with the same USB subclass in response to a request from the host,
the host sends an inquiry about the number of logical units defined in association with the logic interface with the same communication command,
the USB composite device sends the number of logical units corresponding to the first and second devices in response to the inquiry about the number of logical units from the host,
the host sends an inquiry about device information for each of the logical units with the same communication command,
the first device assigned to a first logical unit sends device information corresponding to the first USB subclass and the second device assigned to a second logical unit sends device information corresponding to the second USB subclass to the host in response to the inquiry about the device information from the host, and the host communicates with the first device with the first communication command and communicates with the second device with the second communication command.

4. The USB communication system according to claim 3, wherein the first and second devices are storage devices that input/output data to/from a storage medium.

5. A USB communication method for establishing communications between a host and a USB composite device including a plurality of devices having different USB subclasses each corresponding to a communication command type of communications with the host, assigning logic interfaces to the devices, and setting one USB subclass to each of the logic interfaces, comprising the steps of:

causing the USB composite device to assign a first device having a first USB subclass corresponding to a first communication command and a second device having a second USB subclass corresponding to a second communication command including the same communication command as the first communication command as devices of the same USB subclass to the same logic interface, and send logic interface information that associates the same logic interface with the same USB subclass in response to a request from the host;

causing the host to send an inquiry about the number of logical units defined in association with the logic interface with the same communication command;

causing the USB composite device to send the number of logical units corresponding to the first and second devices in response to the inquiry about the number of logical units from the host;

causing the host to send an inquiry about device information for each of the logical units with the same communication command;

causing the first device assigned to a first logical unit to send device information corresponding to the first USB subclass in response to the inquiry about the device information from the host;

causing the second device assigned to a second logical unit to send device information corresponding to the second USB subclass to the host in response to the inquiry about the device information from the host; and causing the host to communicate with the first device with the first communication command and to communicate with the second device with the second communication command.

6. The USB communication method according to claim 5, wherein the first and second devices are storage devices that input/output data to/from a storage medium.

* * * * *